United States Patent
Kim et al.

(10) Patent No.: US 12,267,855 B2
(45) Date of Patent: Apr. 1, 2025

(54) METHOD FOR TRANSMITTING, BY USER EQUIPMENT, BEAM MANAGEMENT SIGNAL IN WIRELESS COMMUNICATION SYSTEM SUPPORTING SIDELINK, AND APPARATUS THEREFOR

(71) Applicant: LG ELECTRONICS INC., Seoul (KR)

(72) Inventors: Youngdae Kim, Seoul (KR); Yeongjun Kim, Seoul (KR); Jinyup Hwang, Seoul (KR); Jungyong Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 405 days.

(21) Appl. No.: 17/904,656

(22) PCT Filed: Feb. 20, 2020

(86) PCT No.: PCT/KR2020/002474
§ 371 (c)(1),
(2) Date: Aug. 19, 2022

(87) PCT Pub. No.: WO2021/167132
PCT Pub. Date: Aug. 26, 2021

(65) Prior Publication Data
US 2023/0104530 A1   Apr. 6, 2023

(51) Int. Cl.
*H04W 72/40*  (2023.01)
*H04L 1/18*  (2023.01)
(Continued)

(52) U.S. Cl.
CPC ............... *H04W 72/40* (2023.01); *H04L 1/18* (2013.01); *H04W 16/28* (2013.01);
(Continued)

(58) Field of Classification Search
None
See application file for complete search history.

(56) References Cited

U.S. PATENT DOCUMENTS

| | | | |
|---|---|---|---|
| 2018/0167883 A1 | 6/2018 | Guo et al. | |
| 2018/0234935 A1* | 8/2018 | Uchiyama | H04W 56/0015 |

(Continued)

FOREIGN PATENT DOCUMENTS

| | | | |
|---|---|---|---|
| CN | 110536429 A | * 12/2019 | H04W 72/046 |
| CN | 110583032 A | * 12/2019 | H04W 24/02 |

(Continued)

OTHER PUBLICATIONS

Author Unknown, Remaining issues on synchronization mechanism for NR sidelink, Doc. No. R1- 2000879 , pp. 1-3, Feb. 15, 2020.*

(Continued)

*Primary Examiner* — Christopher M Crutchfield
(74) *Attorney, Agent, or Firm* — LEE, HONG, DEGERMAN, KANG & WAIMEY

(57) ABSTRACT

Disclosed are, according to various embodiments, a method for transmitting, by a user equipment (UE), a beam management signal in a wireless communication system supporting a sidelink, and an apparatus therefor. Disclosed are a method for transmitting, by a UE, a beam management signal in a wireless communication system supporting a sidelink, and an apparatus therefor, the method comprising the steps of: acquiring beam configuration information including information on a beam acquisition ID allocated to the UE; determining a first transmission interval from among a plurality of transmission intervals in which the beam management signal can be transmitted within a preset period; and transmitting the beam management signal in the first transmission interval, wherein a continuous interval index is allocated to each of the plurality of transmission (Continued)

intervals, and the first transmission interval supports a sidelink determined on the basis of the beam acquisition ID.

16 Claims, 21 Drawing Sheets

(51) Int. Cl.
*H04W 16/28* (2009.01)
*H04W 56/00* (2009.01)
*H04W 72/0446* (2023.01)
*H04W 72/0453* (2023.01)
*H04W 72/232* (2023.01)
*H04W 92/18* (2009.01)

(52) U.S. Cl.
CPC ..... *H04W 56/001* (2013.01); *H04W 72/0446* (2013.01); *H04W 72/0453* (2013.01); *H04W 72/232* (2023.01); *H04W 92/18* (2013.01)

(56) References Cited

U.S. PATENT DOCUMENTS

2022/0345942 A1* 10/2022 Xu .................. H04W 72/53
2022/0417867 A1* 12/2022 Yoshioka ............ H04W 52/383

FOREIGN PATENT DOCUMENTS

| KR | 2019-0070146 | 6/2019 |
| WO | 2019-036578 | 2/2019 |
| WO | WO-2019160973 A1 * | 8/2019 |

OTHER PUBLICATIONS

Author Unknown, Sidelink synchronization mechanisms for NR V2X, Doc. No. R1-1911885, pp. 1-24, Nov. 18, 2019.*
Author Unknown, Feature lead summary on AI 7.2.4.3 Sidelink synchronization mechanism, Doc. No. R1-1912157, pp. 1-40, Nov. 18, 2019.*
PCT International Application No. PCT/KR2020/002474, International Search Report dated Nov. 20, 2020, 4 page.
Huawei et al., "Paging mechanism with beam sweeping," R2-1801096, 3GPP TSG-RAN WG2 Nr Ad hoc 0118, Jan. 2018, 4 pages.
Huawei et al., "Beamforming for V2X sidelink for FR1 and FR2," R1-1900862, 3GPP TSG RAN WG1 Ad-Hoc Meeting 1901, Jan. 2019, 7 pages.

* cited by examiner (a)

* Interval index
n1 = 0, n2 = 1, n3 = 2

FIG. 16

* Interval index
n1 = 0, n2 = 1, n3 = 2, n4 = 3, n5 = 4

METHOD FOR TRANSMITTING, BY USER EQUIPMENT, BEAM MANAGEMENT SIGNAL IN WIRELESS COMMUNICATION SYSTEM SUPPORTING SIDELINK, AND APPARATUS THEREFOR

CROSS-REFERENCE TO RELATED APPLICATION(S)

This application is the National Stage filing under 35 U.S.C. 371 of International Application No. PCT/KR2020/002474, filed on Feb. 20, 2020, the contents of which is hereby incorporated by reference herein in its entirety.

BACKGROUND OF THE INVENTION

Field of the Invention

The present disclosure relates to a method and apparatus for determining a transmission interval, in which a terminal transmits a beam management signal, in a wireless communication system supporting sidelink.

Description of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X can be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object to be achieved is to determine, based on a beam acquisition ID, a transmission interval for transmitting a beam management signal among a plurality of transmission intervals and to distribute transmission times of beam management signals as far away from each other as possible between terminals, thereby minimizing the half duplex problem.

The technical objects are not limited to the above-mentioned technical objects, and other technical objects that are not mentioned will be clearly understood by those skilled in the art through the following descriptions.

According to an aspect, in a wireless communication system supporting sidelink, a method for transmitting, by a user equipment (UE), a beam management signal may include: obtaining beam setting information including information on a beam acquisition ID allocated to the UE; determining a first transmission interval among a plurality of transmission intervals in which the beam management signal can be transmitted within a preset period; and transmitting the beam management signal in the first transmission interval, and a consecutive interval index may be allocated to each of the plurality of transmission intervals, and the first transmission interval may be determined based on the beam acquisition ID.

Alternatively, the beam management signal is initially transmitted in a first transmission interval with an interval index that corresponds to a value calculated by modular arithmetic between the beam acquisition ID and the number of the plurality of transmission intervals.

Alternatively, the beam management signal is repeatedly transmitted in a first transmission interval having an interval index that is calculated by applying an offset to an interval index of a transmission interval in which the beam management signal is transmitted immediately before the preset period, and the offset is determined based on the beam acquisition ID.

Alternatively, the offset is determined based on N(i) that is calculated the equation below.

$$N(i) = \text{floor}(N(i-1)/C, 1)$$

Here, i is the number of repeated transmissions of the beam management signal, C is the number of the plurality of transmission intervals, and N(0) is a value corresponding to the beam acquisition ID.

Alternatively, the offset is determined to be a value corresponding to $X_2(i)$ that is calculated the equation below.

$$X_2(i) = \text{mod}(,C), X_1(i) = \text{mod}(N(i), C)$$

Here, $X_1(0)$ is a value that is calculated by modular arithmetic between the beam acquisition ID and the number of the plurality of transmission intervals.

Alternatively, an interval index of the first transmission interval is determined to be a value corresponding to n(i) that is calculated by the equation below.

$$n(i) = \text{mod}(n(i-1) + X_2(i), C)$$

Here, n(0) corresponds to $X_1(0)$.

Alternatively, the beam acquisition ID is sequentially preallocated for UEs that belong to a preset geographic area.

Alternatively, the preset geographic area is determined based on a zone ID corresponding to geographical information measured by the UE.

Alternatively, the number of the plurality of transmission intervals is determined based on a time required for the UE to perform beam sweeping by using transmission beams.

Alternatively, the beam management signal is transmitted only in a first transmission interval that is one of the plurality of transmission intervals.

Alternatively, the UE performs a search for a transmission beam transmitted by another UE in the remaining transmission intervals excluding the first transmission interval among the plurality of transmission intervals.

Alternatively, the UE determines transmission timing of the beam management signal associated with the plurality of transmission intervals, based on synchronization timing of a global navigation satellite system (GNSS).

Alternatively, receiving a beam management signal from another UE and verifying a beam management signal for the another UE based on a beam acquisition ID included in the beam management signal for the another UE are further included.

According to another aspect, a user equipment (UE) transmitting a beam management signal in a wireless communication system supporting sidelink may include a radio frequency (RF) transceiver and a processor coupled with the RF transceiver, and the processor may be configured to obtain beam setting information including information on a beam acquisition ID allocated to the UE, to determine a first transmission interval among a plurality of transmission intervals in which the beam management signal can be transmitted within a predetermined period, and to transmit the beam management signal in the first transmission interval by controlling the RF transceiver, and the first transmission interval may be determined based on the beam acquisition ID.

According to another aspect, a chipset generating a beam management signal in a wireless communication system supporting sidelink may include a memory configured to storing a program associated with generating a beam management signal and a processor configured to generate a beam management signal based on the program stored in the memory, and the processor may be further configured to obtain beam setting information including information on a beam acquisition ID allocated from the memory to the UE, to determine a first transmission interval among a plurality of transmission intervals in which the beam management signal can be transmitted within a preset period, and to generate the beam management signal that is to be transmitted in the first transmission interval, and the first transmission interval may be determined based on the beam acquisition ID.

Alternatively, the processor adjusts a driving mode of a device connected to the UE based on the first transmission interval.

According to various embodiments, by determining, based on a beam acquisition ID, a transmission interval for transmitting a beam management signal among a plurality of transmission intervals, transmission times of beam management signals may be distributed as far away from each other as possible between terminals, and thus the half duplex problem may be minimized or prevented.

Effects obtained in the present disclosure are not limited to the above-mentioned effects, and other effects not mentioned above may be clearly understood by those skilled in the art from the following description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 15 and FIG. 16 are views for explaining a method for determining a transmission interval of a beam management signal based on a beam acquisition ID.

DETAILED DESCRIPTION OF THE INVENTION

Figure 1:
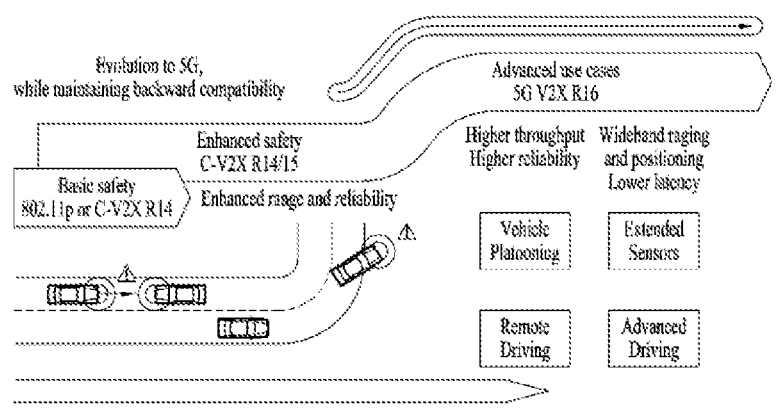
FIG. 1 is a diagram for explaining by comparing V2X communication based on RAT before NR and V2X communication based on NR

The wireless communication system is a multiple access system that supports communication with multiple users by sharing available system resources (eg, bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR can utilize all available spectrum resources, from low frequency bands below 1 GHz to intermediate frequency bands from 1 GHz to 10 GHz and high frequency (millimeter wave) bands above 24 GHz.

Figure 2:
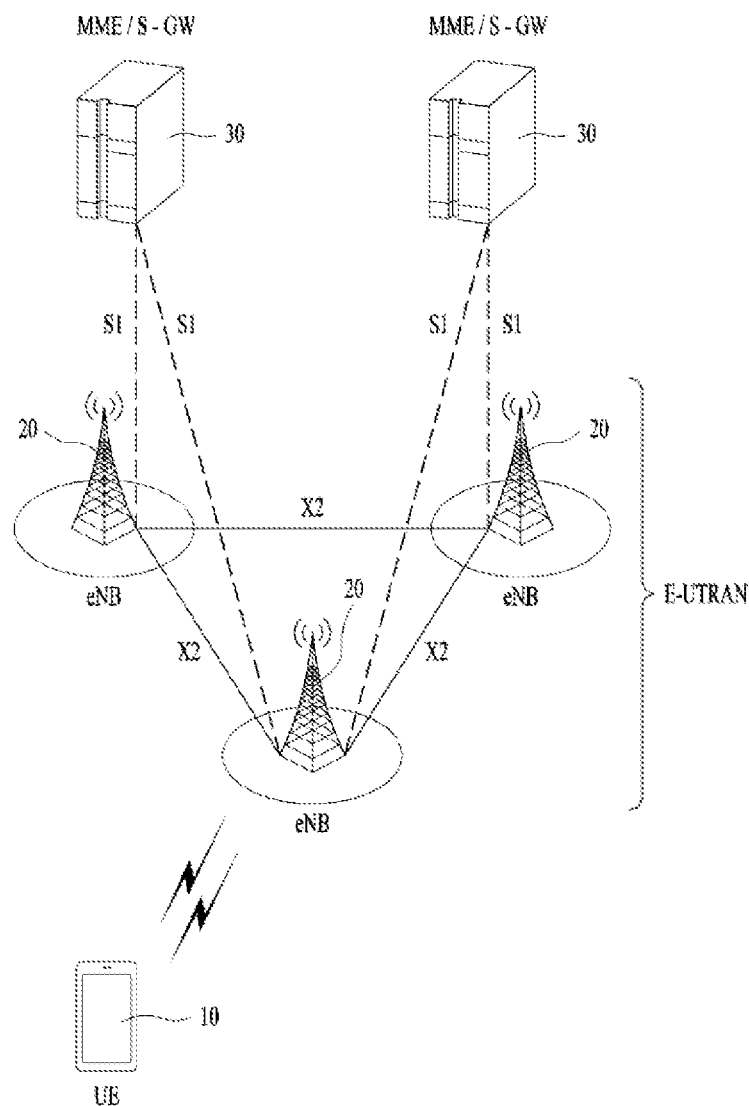
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
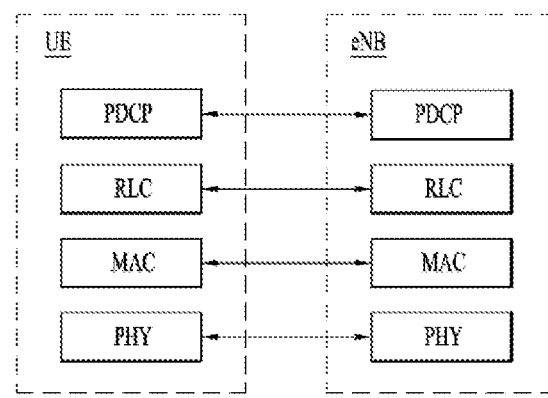
FIG. 3 illustrates a user-plane radio protocol architecture to which embodiment(s) are applicable.

FIG. 3 illustrates a user-plane radio protocol architecture to which the present disclosure is applicable.

Figure 4:
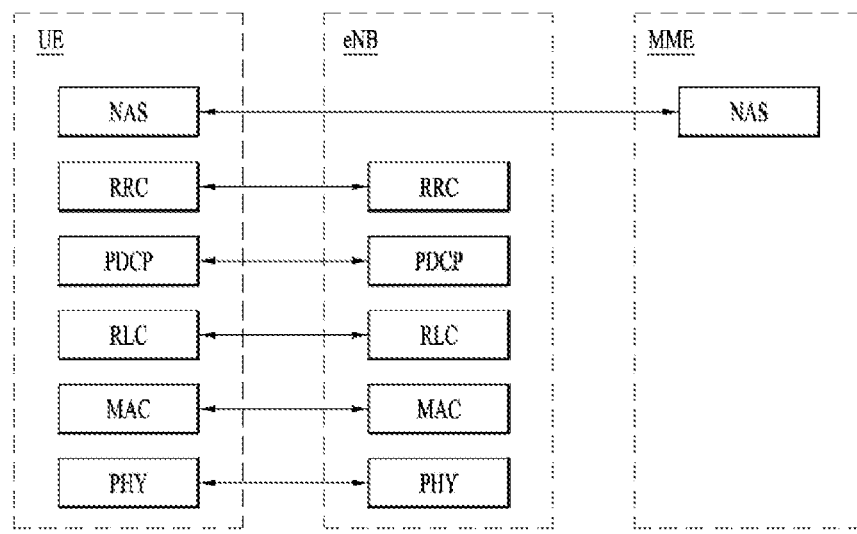
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC CONNECTED state, and otherwise, the UE is placed in RRC IDLE state. In NR, RRC INACTIVE state is additionally defined. A UE in the RRC INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
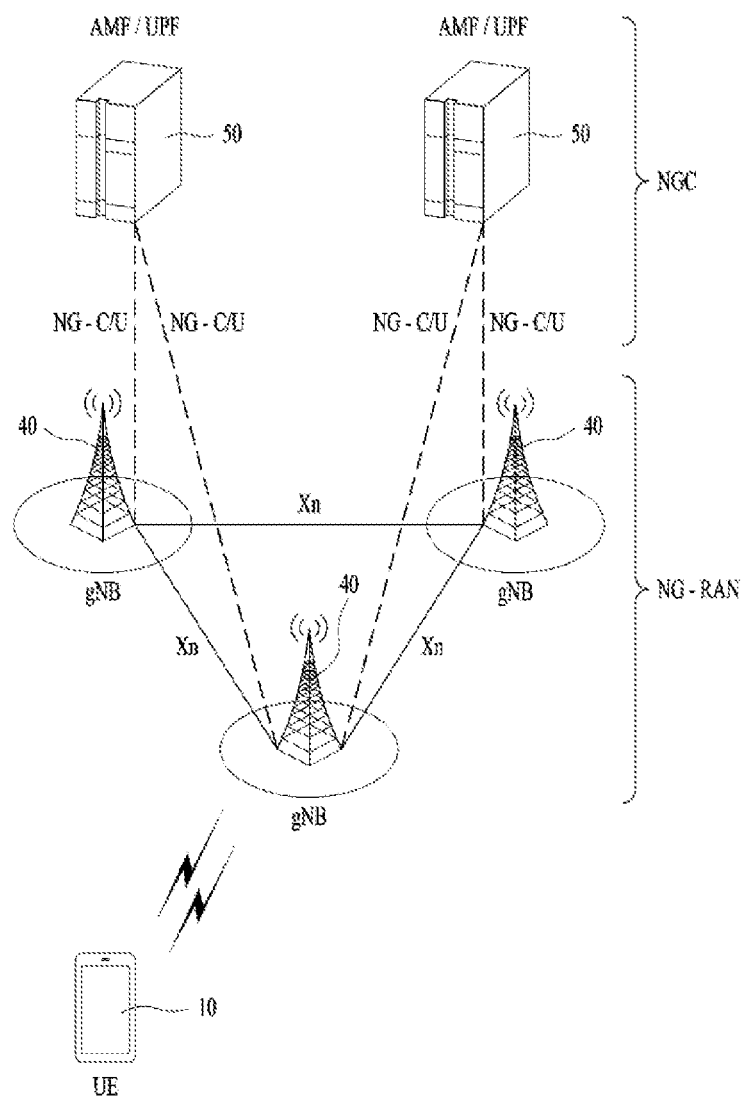
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
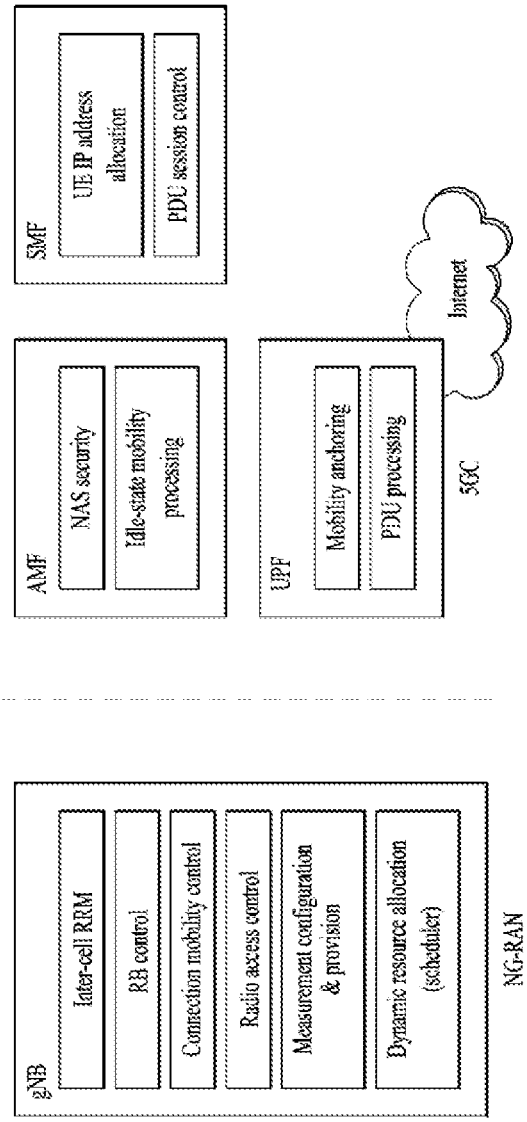
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
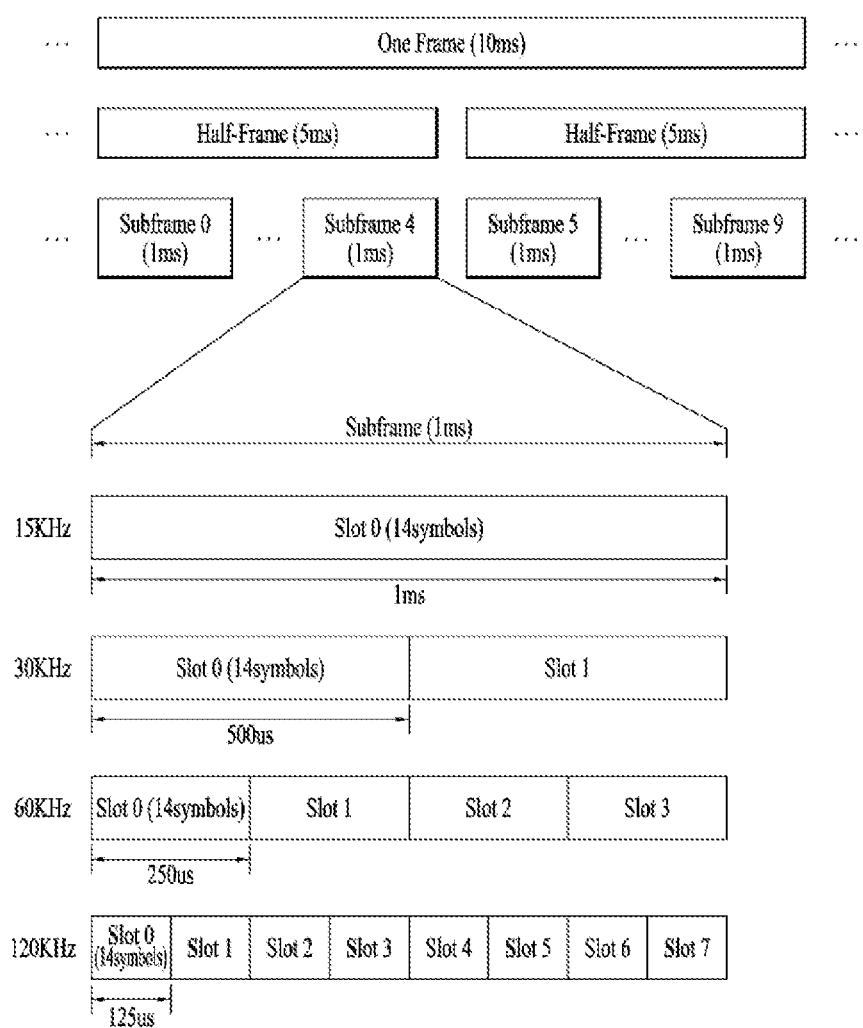
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2^u) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 KHz |
| FR2 | 24250 MHz-52600 MHz | 60, 120, 240 KHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410 MHz-7125 MHz | 15, 30, 60 KHz |
| FR2 | 24250 MHz-52600 MHz | 60, 120, 240 KHz |

Figure 8:
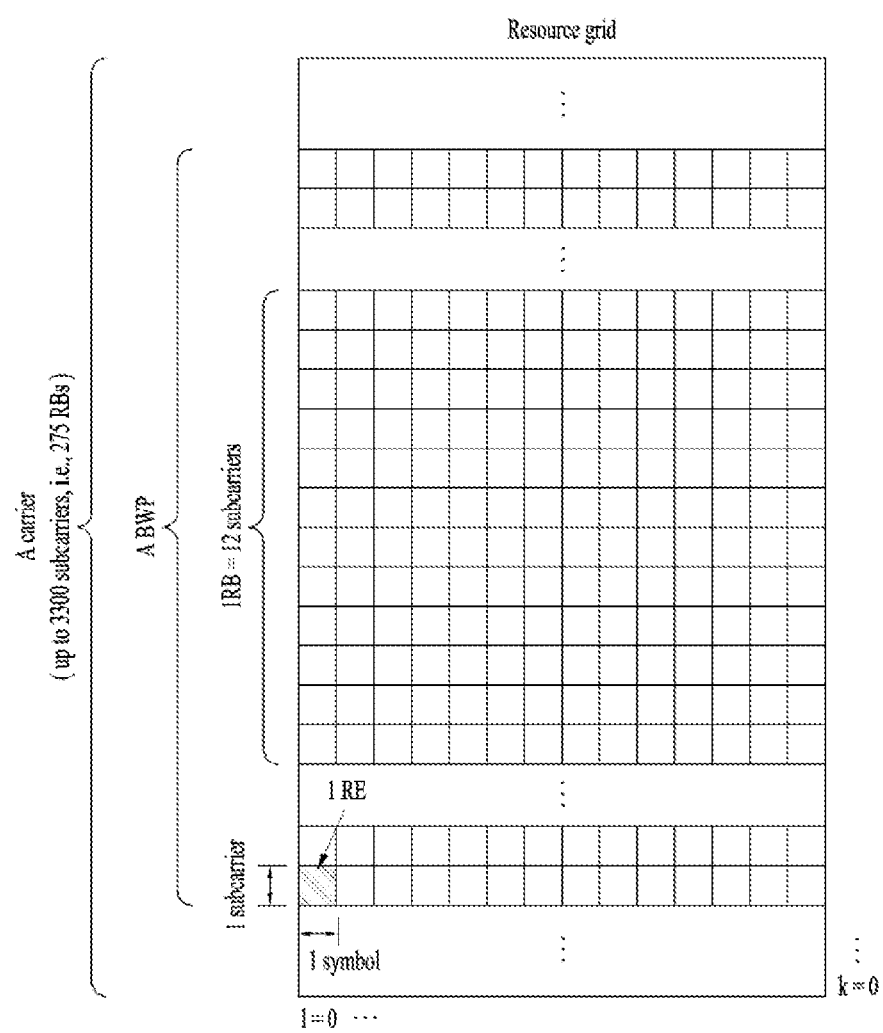
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE), and one complex symbol may be mapped thereto.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
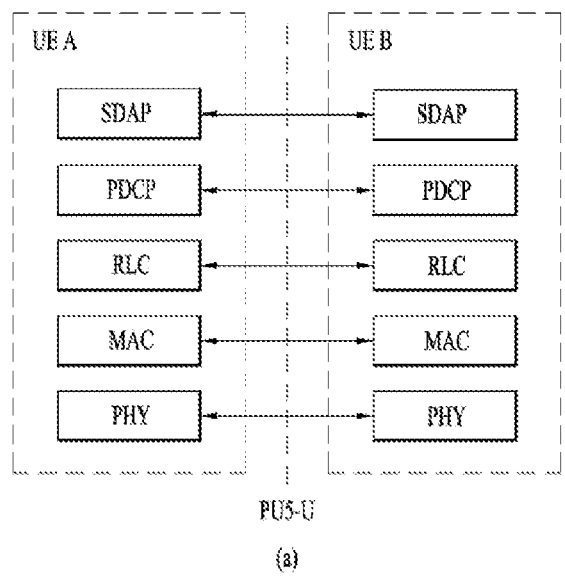
FIG. 9 illustrates a radio protocol architecture for SL communication.
Figure 9:
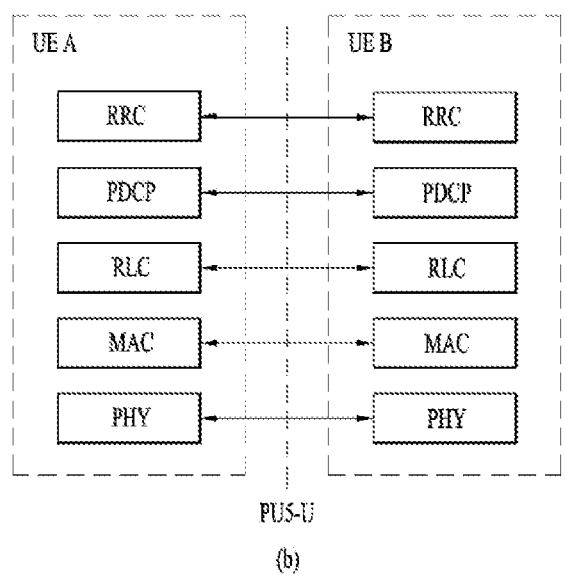

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
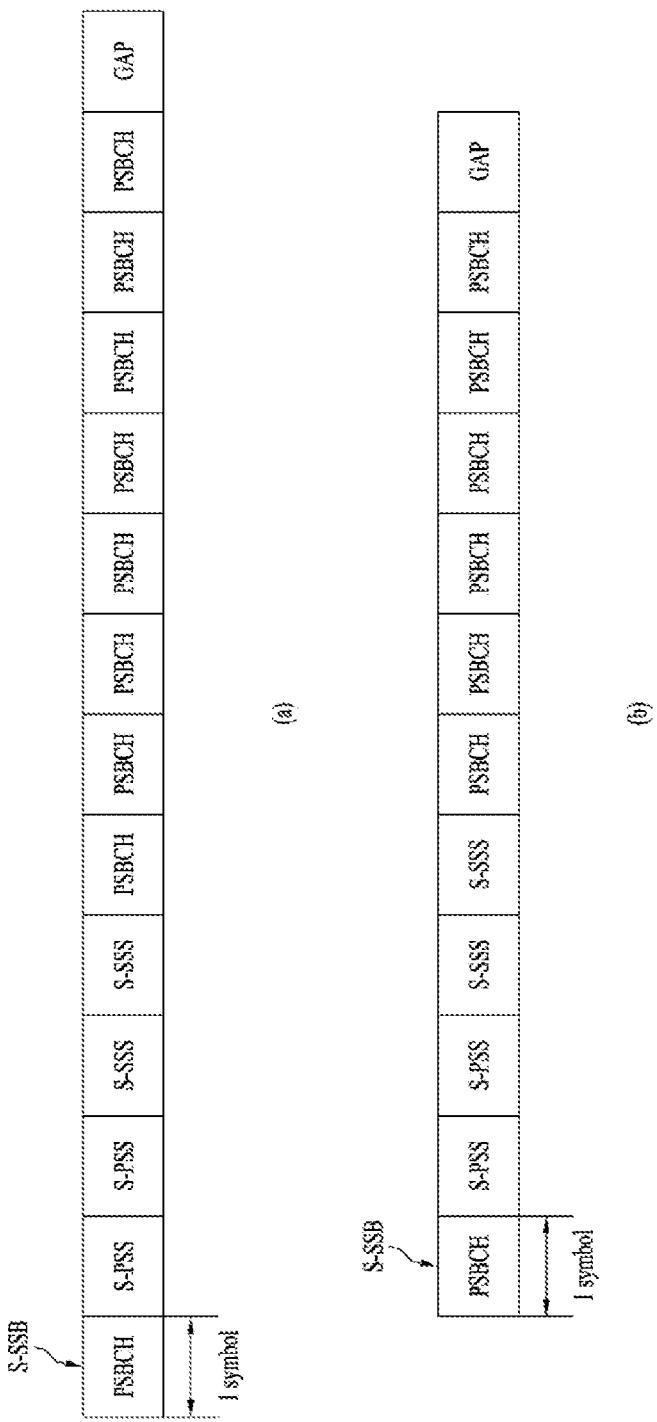
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
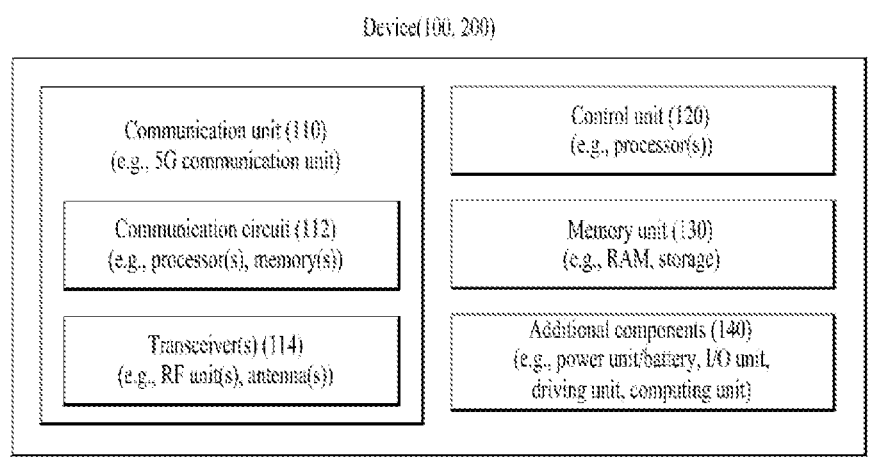
FIG. 20 shows another example of a wireless device which is applied to the present disclosure. The wireless device may be implemented in various forms according to a use-case/service.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
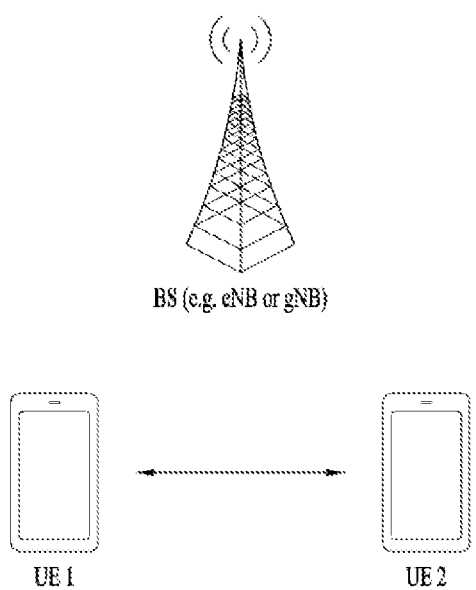
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
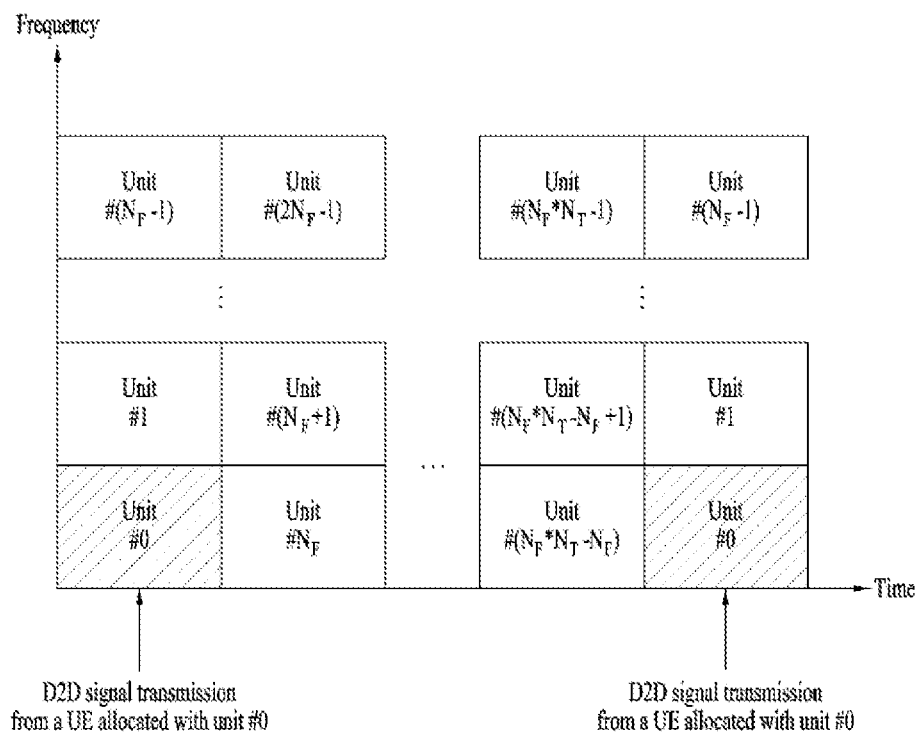
FIG. 12 illustrates resource units for V2X or SL communication.

FIG. 12 illustrates resource units for V2X or SL communication.

Referring to FIG. 12, the frequency resources of a resource pool may be divided into $N_F$ sets, and the time resources of the resource pool may be divided into NT sets. Accordingly, a total of $N_F*N_T$ resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MC S) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
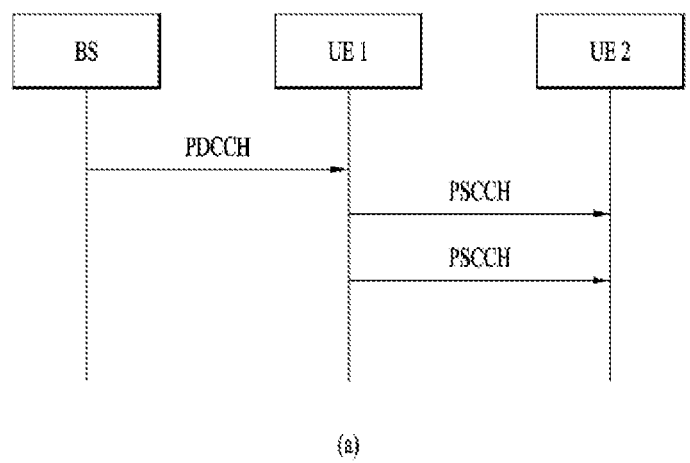
FIG. 13 illustrates a procedure in which UEs perform V2X or SL communication according to a transmission mode.
Figure 13:
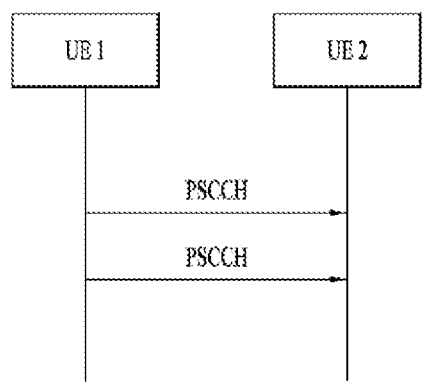

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 24-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 24-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may represent a slot offset between DCI reception and a first SL transmission scheduled by DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the B S/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition of an SL terminal will be described.

In a time division multiple access (TDMA) system and a frequency division multiples access (FDMA) system, accurate time and frequency synchronization is necessary. When time and frequency synchronization is not accurate, the system performance may be degraded due to inter symbol interference (ISD) and inter carrier interference (ICI). This is the same on V2X. In V2X, for time/frequency synchronization, a sidelink synchronization signal (SLSS) may be used in a physical layer, and master information block-sidelink-V2X (MIB-SL-V2X) may be used in a radio link control (RLC) layer.

Figure 14:
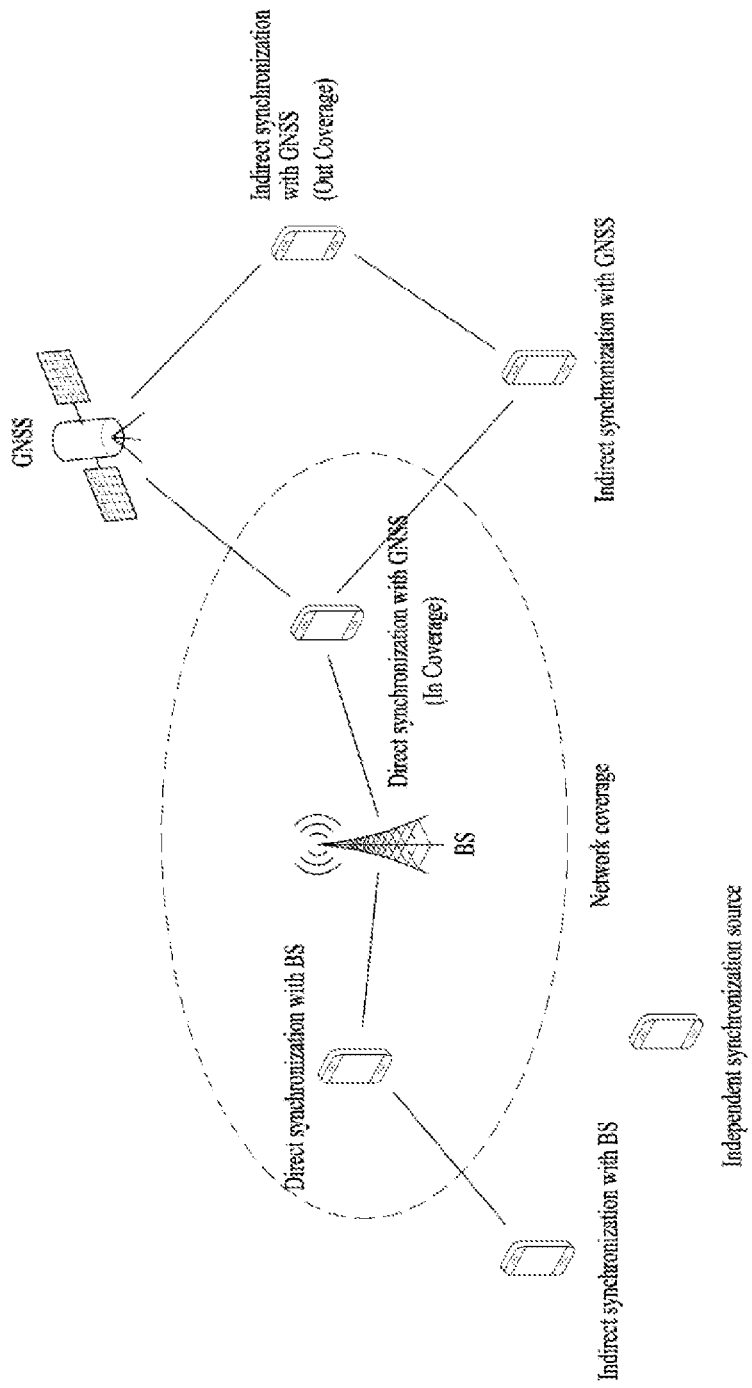
FIG. 14 shows a synchronization source or a synchronization reference of V2X.

FIG. 14 shows a synchronization source or a synchronization reference of V2X.

Referring to FIG. 14, in V2X, a terminal may be synchronized directly with global navigation satellite systems (GNSS) or be synchronized indirectly with GNSS through a terminal (inside network coverage or outside network coverage), which is directly synchronized with GNSS. In case GNSS is determined to be a synchronization source, the terminal may calculate a direct frame number (DFN) and a subframe number by using coordinated universal time (UTC) and (pre)set DFN offset.

Alternatively, a terminal may be synchronized directly with a base station or be synchronized with another terminal that is time/frequency-synchronized with the base station. For example, the base station may be eNB or gNB. For example, when a terminal is within network coverage, the terminal may receive synchronization information provided by a base station and be synchronized directly with the base station. Then, the terminal may provide synchronization information to another terminal that is adjacent to it. When base station timing is set as a synchronization reference, a terminal may follow a cell associated with a corresponding frequency (within cell coverage at the frequency), a primary cell or a serving cell (outside cell coverage at the frequency) for synchronization and downlink measurement.

A base station (e.g., a serving cell) may provide a synchronization setting for a carrier used in V2X or SL communication. In this case, a terminal may follow the synchronization setting that is received from the base station. When a terminal does not detect any cell from a carrier used in the V2X or SL communication and does not receive any synchronization setting from a serving cell, the terminal may follow a preset synchronization setting.

Alternatively, a terminal may be synchronized with another terminal that does not obtain synchronization information directly or indirectly from a base station or a GNSS. A synchronization source and preference may be preset to a terminal. Alternatively, a synchronization source and preference may be set through a control message that is provided by a base station.

An SL synchronization source may be associated with a synchronization priority. For example, the relationship between a synchronization source and a synchronization priority may be defined as in Table 5 or Table 6. Table 5 or Table 6 is merely one example, and the relationship between a synchronization source and a synchronization priority may be defined in various forms.

TABLE 5

| Priority level | GNSS-based synchronization | Base station-based synchronization (eNB/gNB-based synchronization) |
| --- | --- | --- |
| P0 | GNSS | Base station |
| P1 | Every terminal directly synchronized with GNSS | Every terminal directly synchronized with a base station |
| P2 | Every terminal indirectly synchronized with GNSS | Every terminal indirectly synchronized with a base station |
| P3 | All the other terminals | GNSS |
| P4 | N/A | Every terminal directly synchronized with GNSS |
| P5 | N/A | Every terminal indirectly synchronized with GNSS |
| P6 | N/A | All the other terminals |

TABLE 6

| Priority level | GNSS-based synchronization | Base station-based synchronization (eNB/gNB-based synchronization) |
| --- | --- | --- |
| P0 | GNSS | Base station |
| P1 | Every terminal directly synchronized with GNSS | Every terminal directly synchronized with a base station |
| P2 | Every terminal indirectly synchronized with GNSS | Every terminal indirectly synchronized with a base station |
| P3 | Base station | GNSS |
| P4 | Every terminal directly synchronized with a base station | Every terminal directly synchronized with GNSS |
| P5 | Every terminal indirectly synchronized with a base station | Every terminal indirectly synchronized with GNSS |
| P6 | Remaining terminal(s) with low priority | Remaining terminal(s) with low priority |

In Table 5 or Table 6, P0 may mean a highest priority, and P6 may mean a lowest priority. In Table 5 or Table 6, a base station may include at least one of gNB or eNB.

It may be set (in advance) whether to use GNSS-based synchronization or base station-based synchronization. In a single-carrier operation, a terminal may derive transmission timing of the terminal from an available synchronization reference with a highest priority.

Tx/Rx Beam Sweep

When a very high frequency such as mmWave is used, beamforming may be used for the purpose of overcoming a high general pathloss. In order to use beamforming, it is first necessary to detect a best beam pair from among several beam pairs between a transmitter and a receiver. This process may be referred to as beam acquisition or beam tracking from the standpoint of the receiver. In particular, since mmWave uses analog beamforming, the vehicle needs to perform beam sweeping for switching a beam in different directions at different times by using its own antenna array in the process of beam acquisition or beam tracking.

Transmission of Beam Management Signal/channel

A UE may periodically transmit a beam management signal or channel to other UEs in order to notify its existence. Herein, the beam management signal may be a signal corresponding to a sidelink signal. In addition, in order to acquire an initial beam, a UE may detect a beam management signal transmitted by other UEs. For example, in case there is no method for detecting other UEs by using sub-6 Ghz sidelink connection or lidar, a UE may have sidelink communication through beam acquisition of the other UEs only when detecting a beam management signal transmitted by other neighboring UEs.

However, in case a UE randomly selects a transmission time of a beam management signal, the UE may not know when another UE transmits a sidelink beam management signal. In this case, the UE should always try to detect a signal/channel when not transmitting a signal/channel. Furthermore, a UE may not detect another UE due to the failure of beam alignment with the another UE.

In order to solve the above-described problem, every UE needs to efficiently determine a transmission time of the beam management signal. Specifically, in case a plurality of vehicles are present in a mmWave V2X communication system, transmission times of beam management signals of each vehicle need to be determined and distributed as far away from each other as possible in order to solve the half duplex problem.

Specifically, in order to solve the half duplex problem between UEs (vehicles) (in case reception and transmission cannot be performed at the same time, if specific UEs always transmit a signal at the same time, the UEs cannot receive a signal from each other), transmission times of the beam management signal between the UEs (vehicles) should be different. However, a transmission interval (window) of a signal/channel for beam management cannot be large without restriction. Accordingly, when there are many vehicles in a single area (cell or zone), transmission times of a plurality of UEs cannot avoid overlapping each other. In this case, when a UE transmits a signal at a same time within a transmission interval in each period, since beamforming according to communication or beam sweeping cannot be fully performed between UEs with overlapping transmission times, a transmission beam or a beam management signal for the beam sweeping needs to be transmitted at another time within a transmission interval (window) in each signal transmission period of each of the UEs.

Herein, a beam management signal or channel may be a signal that needs to be periodically transmitted for initial beam acquisition or beam recovery in mmWave communication. The beam management signal or channel may include a signal of SSB in NR Uu.

According to various embodiments, a signal transmission time may be periodically determined as randomly as possible in a transmittable interval (window) of a beam management signal and/or channel. Alternatively, UEs may determine transmission timing of a beam management signal based on a method for determining transmission timing of a same beam management signal irrespective of a transmittable interval (window) size. According to various embodiments described below, when there is a plurality of vehicles in a specific area, the vehicles may detect each other as quickly as possible by differentiating transmission times of a beam management signal/channel as much as possible. In other words, when there is a plurality of vehicles in a specific area (or geographic area or zone), the vehicles (or UEs) may minimize a time required to complete beam tracking or beam acquisition by differentiating transmission times of a beam management signal as much as possible.

Furthermore, when IDs are consecutively allocated to each UE for the purpose of beam acquisition, transmission timing of a beam management signal among the UEs may be randomized as much as possible by adjusting the transmission timing of the beam management signal based on an ID (or beam acquisition ID) allocated to each UE. That is, a transmission time of a beam management signal may be determined based on the beam acquisition ID (BA_ID). Adjustment of transmission timing of a beam management signal based on such a beam acquisition ID (BA_ID) may be advantageous with respect to UE management.

First, before describing a method for determining a transmission time or transmission interval of a beam management signal based on a beam acquisition ID (BA_ID), a relevant parameter needs to be defined.

A beam acquisition ID (BA_ID) means a beam acquisition ID allocated to respective UEs for beam acquisition. Herein, the beam acquisition ID (BA_ID) may be allocated with integers from 0 to N−1 in consecutive order to UEs included in a preset area.

The size (C) of a transmission window may be defined as the number of transmission time slots included in the transmission window or the number of multiple transmission intervals included in a preset period. Herein, a UE may perform beam sweeping using a transmission beam in a transmission time slot or during any one transmission interval among a plurality of transmission intervals (j=0, 1, 2, . . . , C−1). The size (C) of the transmission window may be determined or set in advance based on the number of UEs included in a preset area.

A transmission window period (P) means a size of the preset period, and the size of the preset period may be set to any one time of 5, 10, 20, 40, 80, 160, 320 and 640, for example.

StartOffset may be defined as an offset indicating a start subframe or time resource unit of the transmission window (or preset period). StartOffset may be set based on the transmission window period (P). For example, in the case of P=5, a StartOffset value may be set to any one of 0, 1, 2, 3 and 4.

Meanwhile, a gNB or a base station may preconfigure, among the parameters, a transmission window (or preset period) and periodicity of the preset period (or transmission window) for a beam management signal/channel of sidelink. In this case, a UE may transmit the beam management signal/channel at a specific time (at any one interval among a plurality of transmission intervals) within the transmission window (or preset period) and attempt to detect a signal/channel of another UE in another time period within the window (e.g., the remaining transmission intervals excluding the specific time from the plurality of transmission intervals). In addition, a gNB or a base station may preconfigure not only a parameter associated with the above-described transmission window but also some or all of the above-described parameters and signal them to the UEs.

Figure 15:
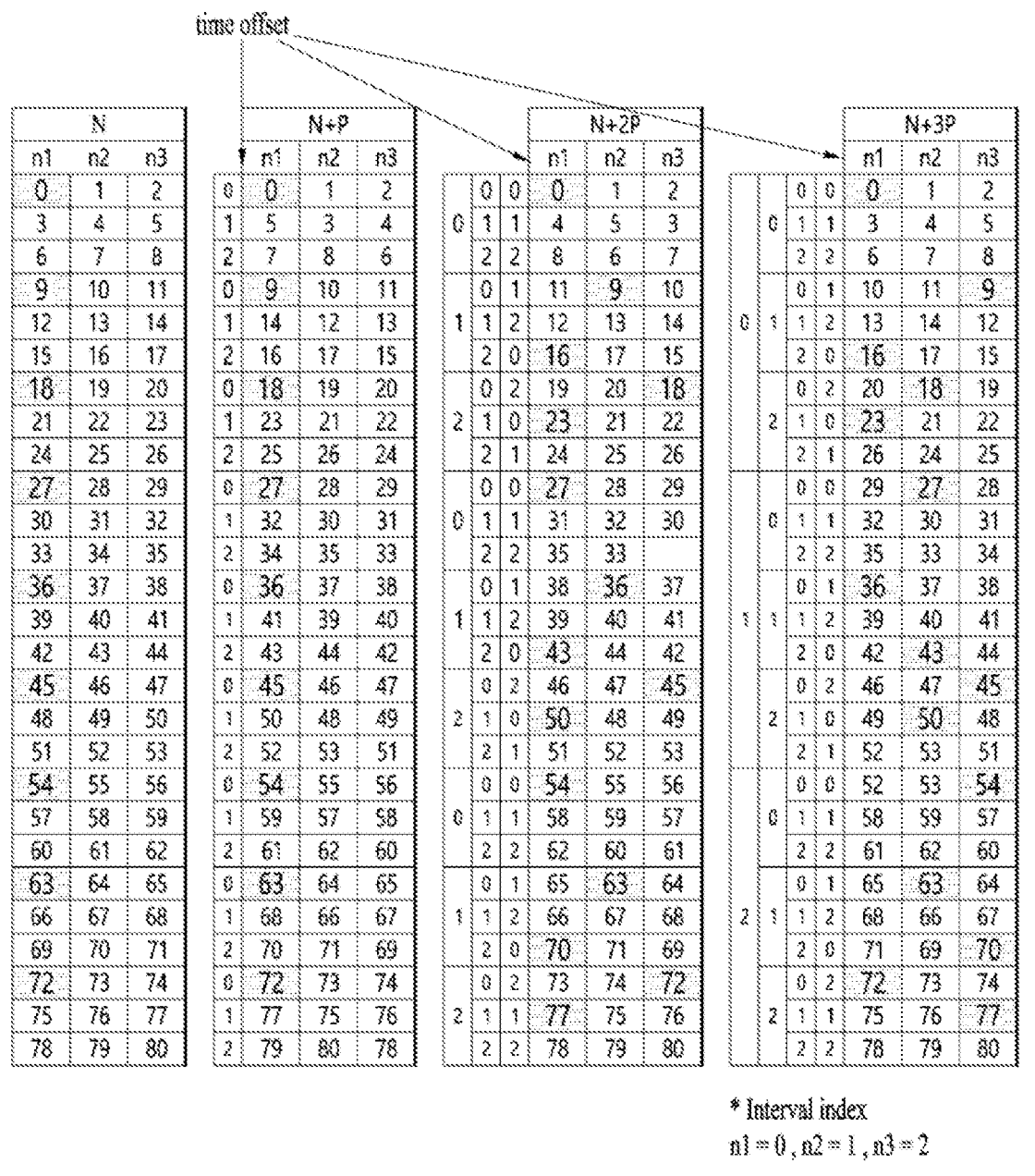
Figure 16:
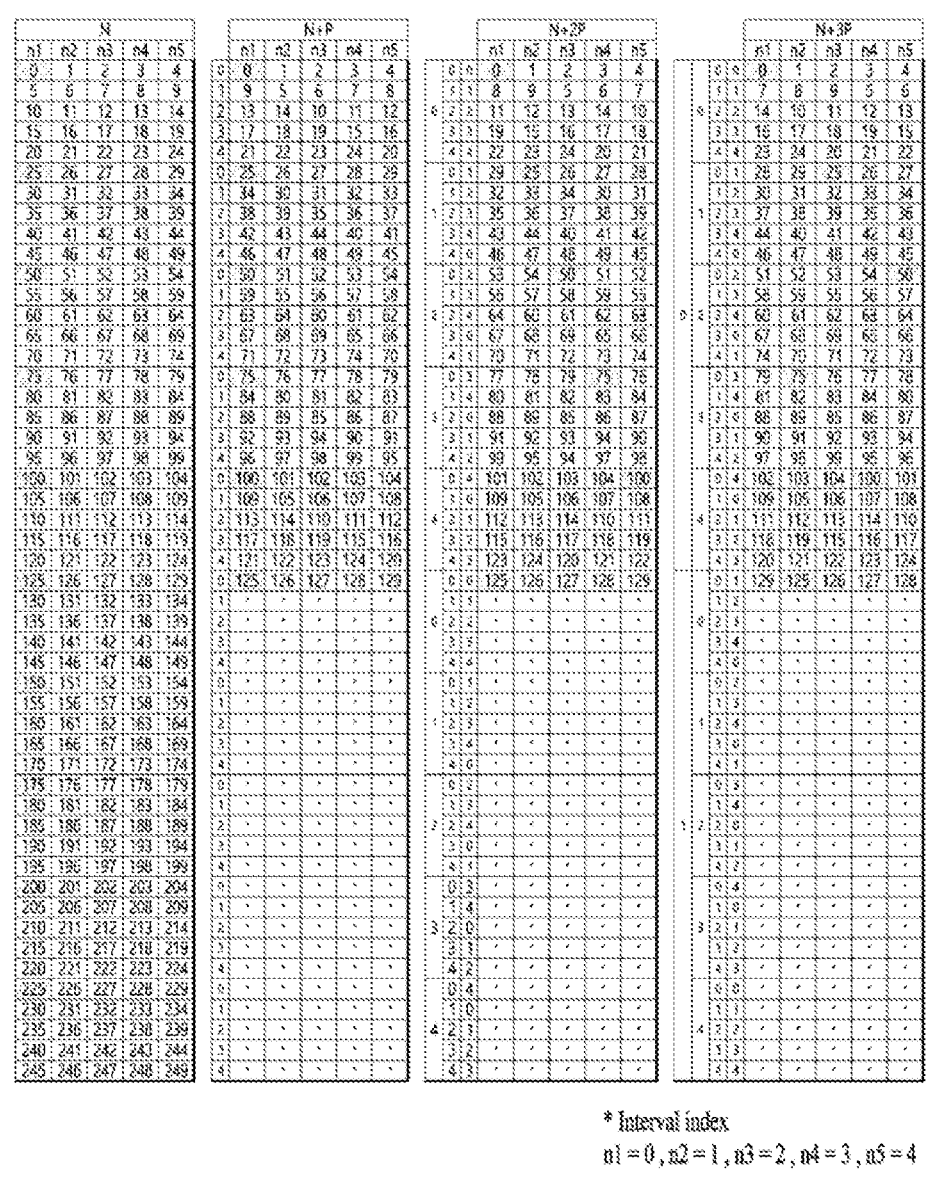

FIG. 15 and FIG. 16 are views for explaining a method for determining a transmission interval of a beam management signal based on a beam acquisition ID.

Referring to FIG. 15, each number indicates a beam acquisition ID for acquiring a beam that is allocated for each vehicle or UE in advance. Herein, UEs may be given each of beam acquisition IDs (BA_ID) ranging from 0 to 81 in consecutive order. It is possible to assume that 3 vehicles or UEs are capable of consecutively transmitting a beam management signal during a transmittable interval (or preset period) for a beam management signal or channel. That is, a preset transmission period associated with transmitting a beam management signal may include 3 transmission intervals (or transmission interval) in which 3 beam management signals may be sequentially transmitted.

In addition, a UE or a vehicle may transmit the beam management signal in each of a plurality of preset periods. Referring to FIG. 15, a preset period in which initial transmission of the beam management signal is performed is illustrated as N, a preset period in which first repetitive transmission of the beam management signal is performed is illustrated as N+P, and a preset period in which second repetitive transmission of the beam management signal is performed is illustrated as N+2P. Herein, the preset period or transmission window may be P.

In addition, a separate interval index may be allocated to each of the plurality of transmission intervals, and interval indexes, which are successive integers from 0, may be allocated in advance to a plurality of transmission intervals (n1, n2 and n3) included in a preset period (for example, a group index of n1 is 0, a group index of n2 is 1, and a group index of n3 is 2). Herein, a plurality of transmission intervals may be a time corresponding to a time required for one UE to sweep a Tx beam completely.

Meanwhile, in a preset period in which initial transmission of an initial beam management signal is performed, a n1 transmission interval may be expressed by (N,n1). That is, (N,n1) means a transmission interval of n1 within a preset period corresponding to N. For example, UEs (hereinafter, first UE) with beam acquisition IDs (BA_ID) of #0, #3, #6, . . . , #78 may define a transmission interval for transmitting a beam management signal as (N, n1). Meanwhile, in the interval (N, n1) where the first UEs transmit a beam management signal, the remaining UEs may attempt to receive the beam management signal.

According to an embodiment, UEs may use Equation 1 to Equation 4 below in order to differentiate transmission times (or transmission intervals) among them. According to Equation 1 to Equation 4, in N+P, N+2P and N+3P, the first UEs may transmit at least one beam management signal at different transmission times (or different intervals). That is, after passing a total of 4 transmission intervals (for example, in case a preset period is repeated 4 times), all the first UEs may have at least one different transmission time (or transmission interval) to detect each other. For example, referring to FIG. 15, a UE with a beam acquisition ID (BA_ID) of 32 may repeatedly transmit a beam management signal at each of (N, n3), (N+P, n1), (N+2P, n2) and (N+3P, n0) according to Equation 1 to Equation 4. Specifically, a UE may determine an offset to be applied to repetitive transmission of the beam management signal through Equation 1 to Equation 3 and determine an interval index, in which a beam management signal is to be transmitted, through Equation 4.

$$N(i) = \begin{cases} BA\_ID, & i = 0 \\ \left\lfloor \frac{N(i-1)}{C} \right\rfloor & i = 1, 2, \ldots, C-1 \end{cases} \quad \text{Equation 1}$$

$$X(i) = \mod(N(i), C) \quad \text{Equation 2}$$

$$\cdot X' = \begin{cases} X(i), & i = 0 \\ \mod\left(\sum_{1}^{i} X(i), C\right) & i = 1, 2, \ldots, C-1 \end{cases} \quad \text{Equation 3}$$

$$\cdot n(i) = \begin{cases} X'(i), & i = 0 \\ \mod(n(i-1) + X'(i), C) & i = 1, 2, \ldots, C-1 \end{cases} \quad \text{Equation 4}$$

Here, C is a size of a transmission window and means the number of a plurality of transmission intervals in a corresponding transmission period, which is 3 in FIG. 15. As a value corresponding to the number of repeated transmissions of the beam management signal, i is 0 at an initial transmission of the beam management signal and increases by 1 as the transmission is repeated. Alternatively, i may correspond to the number of times the preset period has passed. X'(i) is the offset corresponding at i-th time. In addition, the N(i) and the X(i) are parameters necessary to determine the above-described offset X'(i).

Specifically, a UE may obtain a beam acquisition ID (BA_ID) allocated to it and determine, based on the obtained beam acquisition ID (BA_ID) and the number of a plurality of transmission intervals included in the preset period (or a transmission window size (C)), in which specific transmission interval among the plurality of transmission intervals the beam management signal is to be transmitted. In this case, the UE may determine the specific transmission interval by using the interval index. That is, a UE may determine an interval index to transmit a beam management signal based on the number of the plurality of transmission intervals and a beam acquisition ID (BA_ID) and transmit the beam management signal in a specific transmission interval corresponding to the determined interval index. Alternatively, a UE may determine the specific transmission interval by applying an offset associated with an interval index.

According to an embodiment, a UE may determine an interval index associated with a transmission index for transmitting the beam management signal by means of modular arithmetic between a beam acquisition ID (BA_ID), which is allocated in the case of initial transmission (that is, i=0) of the beam management signal, and the number of the plurality of times. In case a beam acquisition ID (BA_ID) allocated to the UE is 25 and the number of the plurality of times is 3, as illustrated in FIG. 15, an interval index for the initial transmission of the UE becomes 1 that is the remainder when 25 is divided by 3. That is, in the case of initial transmission, a UE may transmit the beam management signal at n2, which is a transmission interval with a group index of 1.

Alternatively, in the case of first repetitive transmission of the beam management signal (that is, i=1 and the beam management signal is repeatedly transmitted in a preset period corresponding to N+P), a UE may determine a transmission interval, in which the beam management signal will be transmitted, based on a previous interval index and offset. The previous interval index is an interval index at which a beam management signal is transmitted in a preset period of N immediately before the preset period of N+P. The offset may be calculated using Equation 1 to Equation 3. Specifically, when a beam acquisition ID (BA_ID) for a UE is 25, since N(1) is a largest integer as the quotient of 25/3, it is 8, X(1) is 2, and X'(1) is 2. That is, a corresponding offset at a first repetitive transmission is 2. Herein, a group index of a transmission interval, in which the beam management signal is transmitted, becomes 0, which is the remainder of 3/3 according to Equation 4. Consequently, a UE may transmit the beam management signal in a transmission interval of n0 with an interval index of 0. In other words, as illustrated in FIG. 15, a UE may transmit a beam management signal at (N+P, n0).

Referring to FIG. 16, beam acquisition IDs (BA_ID) ranging from 0 to 249 may be sequentially allocated to a plurality of UEs. As described above, N indicates a preset period (or a first period) in which the beam management signal is initially transmitted, N+P indicates a preset period (or a second period) in which the beam management signal is repeatedly transmitted for the first time, and N+2P indicates a preset period (or a third period) in which the beam management signal is repeatedly transmitted for the second time. In addition, n1, n2, n3, n4 and n5 mean a plurality of transmission intervals within a preset period. In addition, interval indexes of 0, 1, 2, 3 and 4 may be allocated to n1, n2, n3, n4 and n5 respectively.

According to an embodiment, a UE may acquire a beam acquisition ID (BA_ID) allocated to it. A UE may determine an interval index to transmit a beam management signal based on the beam acquisition ID (BA_ID) and the number of the plurality of transmission intervals, and transmit a beam management signal in a specific transmission interval corresponding to the determined interval index among the plurality of transmission interval. In case the UE initially transmits the beam management signal (or transmits the beam management signal in a first period, or i=0), the UE may determine an interval index corresponding to a result value according to modular arithmetic between the beam management index and the number of the plurality of transmission intervals according to Equation 2 as an interval index for transmitting the beam management signal. For example, a UE, to which a beam identifier of 106 is allocated in a first period in which initial transmission is performed, may determine 1, which is calculated according to Equation 2, as an interval index (that is, a transmission interval n2) for transmitting the beam management signal. In this case, the UE may perform initial transmission of the beam management signal at (N, n2).

After a first period, in a second period and a third period, the UE may determine an offset according to Equation 3 and determine an interval index associated with a transmission interval, in which the beam management signal is repeatedly transmitted, by applying the determined offset to Equation 4. That is, unlike at the initial transmission, the UE may determine an interval index for transmitting a beam management signal by additionally applying an offset. For example, in case the UE performs repetitive transmission of the beam management signal once (or transmits the beam management signal in a second period, or i=1), the UE may determine an interval index for transmitting the beam management signal at (N+P) by inputting an offset according to Equation 3 into Equation 4. For example, a UE, to which a beam identifier of 106 for transmitting a beam management signal at (N+P) is allocated, may determine 2, which is calculated by putting an offset of 1 calculated according to Equation 1 to Equation 3 into Equation 4, as an interval index for transmitting the beam management signal. That is, the UE may transmit a beam management signal at (N+P, n3).

In addition, in case the UE performs repetitive transmission of the beam management signal twice (or transmits the beam management signal in a third period), an offset according to Equation 1 to Equation 3 becomes 0 (that is, floor (21/5)=4, mod (4,5)=4, mod ((1+4), 5)=0). In this case, an interval index for transmitting a beam management signal in the second period is determined to be 2 (that is, mod((2+0),5)=2), and the beam management signal may be transmitted at (N+2P, n3).

Even when the number of a plurality of transmission intervals included in a transmittable interval (window) of a beam management signal/channel or in a preset period is changed, Equation 1 to Equation 4 may be applied like in FIG. 15. That is, irrespective of a transmission window size (C) or a size of a preset period, UEs may determine a transmission interval, in which a beam management signal is to be transmitted in each period, by applying the above-described Equation 1 to Equation 4. In this case, like in FIG. 16, when a total of 4 transmission times (or a total of 4 transmissions of a beam management signal) are reached, each of the UEs may have a different transmission interval at least once.

Meanwhile, the transmission window size or the size of a preset period may be differently set among UEs depending on a communication environment. The proposed invention may significantly mitigate the half-duplex problem since the larger the transmission window size or the size of a preset period the more the beam acquisition IDs (BA_ID) can be allocated. In addition, when the beam acquisition IDs are consecutively allocated, UEs may transmit a beam acquisition signal in transmission intervals that are as different as possible from each other. In addition, such an allocation of beam acquisition IDs (BA_ID) is beneficial to UE management. For example, when C=5 and beam acquisition IDs (BA_ID) of 0~4 (or 5~9, 10~14, etc) are allocated to respective UEs, the UEs may transmit a beam management signal in transmission intervals which are dispersed as far away from each other as possible by Equation 1 to Equation 4, so that the half-duplex problem among the UEs may be prevented or minimized.

Furthermore, by determining a transmission interval according to Equation 1 to Equation 4 described above, a UE may set a transmission time of a beam management signal as randomly as possible in a transmittable interval (transmission window or preset period) of a periodical beam management signal. In addition, in case of out-of-coverage or beam failure, when every UE acquires reference synchronization from GNSS, each of a plurality of UEs may determine a corresponding transmission time based on information on the beam acquisition ID (BA_ID) and a preset period with no help of a network (eNB). That is, the proposed method may apply to stand-alone mmWave sidelink.

Figure 17:
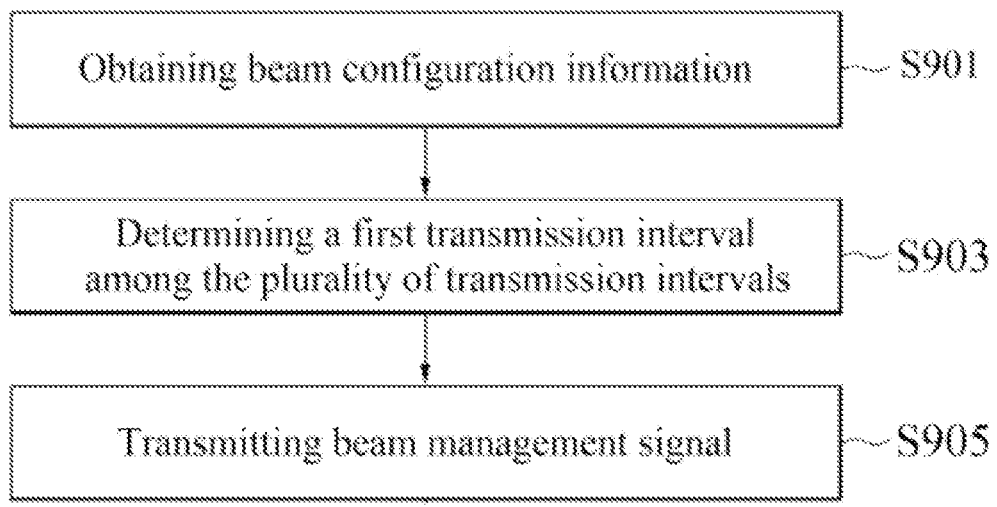
FIG. 17 is a view for explaining a method for determining a transmission interval in which a UE is to transmit a beam management signal.

FIG. 17 is a view for explaining a method for determining a transmission interval in which a UE is to transmit a beam management signal. Meanwhile, as described above, a preset period, in which a beam management signal is transmitted, may be distinguished into a plurality of transmission intervals, and a UE may determine any one transmission interval of the plurality of transmission intervals and transmit a beam management signal in the determined transmission interval.

Referring to FIG. 17, a UE may acquire beam setting information associated with transmitting a beam management signal (S901). The beam setting information may include information on a beam acquisition ID (BA_ID) corresponding to the UE among beam acquisition IDs (BA_ID) that are allocated for a plurality of UEs in a preset area. Herein, a beam acquisition ID (BA_ID) may be allocated by a representative UE among UEs within a preset area or by a base station. Alternatively, the UE may directly allocate a beam acquisition ID (BA_ID) based on the number of neighbor UEs. For example, when the UE obtain information that there are 5 UEs in a preset area as it enters the present area, the UE may allocate 6 as its own beam acquisition ID.

Alternatively, the preset area may be determined based on a zone ID corresponding to geographical information measured by the UE. Herein, the zone ID may be an identifier for a specific area among a plurality of geographic areas that are distinguished based on latitude and longitude. A UE or a base station may specify UE groups, to which beam acquisition IDs (BA_ID) are to be allocated, based on the zone ID. For example, when there are 100 UEs or vehicles in a geographic area corresponding to a specific zone ID, the UE or base station may allocate beam acquisition IDs (BA_ID) corresponding to the 100 UEs or vehicles respectively. In this case, consecutive integers from 1 may be sequentially allocated to the 100 UEs or vehicles respectively.

Alternatively, the UE may perform beam sweeping using a beam management signal within a preset period once. The preset period may have a plurality of transmission intervals distinguished from each other, and the beam sweeping may be performed in any one of the plurality of transmission intervals. In addition, the plurality of transmission intervals may be distinguished with a same time. In this case, the UE may specify the plurality of transmission intervals by dividing the preset period into specific time units (or time units corresponding to the number of the plurality of transmission intervals). Alternatively, the UE may receive information on the plurality of transmission intervals as a setting in advance from the base station or the representative UE. Meanwhile, the number of the plurality of transmission intervals may be a value corresponding to the above-described transmission window size (C).

Alternatively, consecutive integers from 0 to N−1 may be sequentially allocated as interval indexes to the plurality of transmission intervals. Herein, N is a value corresponding to the number of the plurality of transmission intervals or the transmission window size. For example, when the transmission window size (C) is 3, integers of 0, 1 and 2 may be sequentially allocated as a group index to transmission intervals n1, n2 and n3 respectively. Alternatively, a UE may acquire only information on the number of the plurality of transmission intervals from the base station or representative UE and directly specify the plurality of transmission intervals by dividing the preset period into the acquired number of the plurality of transmission intervals or directly allocate interval indexes for the plurality of specified transmission intervals.

Alternatively, each of the plurality of the transmission intervals may have a size determined based on a time required for performing beam sweeping. For example, when the preset period is 100 ms and a time required for the UE to perform beam sweeping is 20 ms, each of the plurality of transmission intervals may have a time size of 20 ms. In this case, the number of the plurality of transmission intervals may be 5.

Next, a UE may determine a transmission interval for transmitting the beam management signal among a plurality of transmission intervals within a period that is preset based on the beam setting information (S903). The UE may determine a transmission interval (or a first transmission interval), which corresponds to an interval index that is determined based on the number of the plurality of transmission intervals and the beam acquisition ID (BA_ID), as a transmission interval for transmitting the beam management signal. Specifically, a UE may determine a transmission interval for transmitting the beam management signal within the preset period by using at least two of an interval index for the plurality of transmission intervals, Equation 1 to Equation 4, the beam acquisition ID (BA_ID), and the number of the plurality of transmission intervals.

Next, the UE may transmit the beam management signal in the determined transmission interval (S905). The UE may transmit the beam management signal only in one transmission interval determined out of a plurality of transmission intervals within the preset period and receive a beam management signal transmitted from other UEs in the remaining transmission intervals. In addition, the UE may determine the transmission interval for a next preset period again. The UE may repeat transmission or retransmit the beam management signal in the redetermined transmission interval in the next preset period. That is, the UE may determine a transmission interval for transmitting the beam management signal in every preset period by using Equation 1 to Equation 4.

Alternatively, a UE may determine the first transmission interval differently according to whether a beam management signal is initially transmitted or repeatedly transmitted. When the beam management signal is initially transmitted (i=0), the UE may perform modular arithmetic (according to Equation 2) between the beam acquisition ID (BA_ID) and the number of the plurality of transmission intervals. In this case, a UE may determine an interval index for transmitting the beam management signal as a value corresponding to a value obtained according to the modular arithmetic. For example, when a beam acquisition ID (BA_ID) for the UE is 21 and the number of the plurality of transmission intervals is 4, the UE may determine 1 as an interval index of a first transmission interval for transmitting the beam management signal.

Alternatively, when the beam management signal is repeatedly transmitted (i≥1), a UE may determine an interval index of the first transmission interval by applying a predetermined offset to an interval index determined in an immediately previous preset period (or immediately previous interval index). That is, a UE may determine an offset in advance by using Equation 1 to Equation 3 and determine an interval index associated with the beam management signal to be repeatedly transmitted by putting the predetermined offset and the initial interval index into Equation 4. Specifically, a UE may determine a value of N(i) by using Equation 1, determine X(i) by putting the value of N(i) into Equation 2 and calculate an offset X'(i) by putting X(i) into Equation 3. Next, a UE may determine an interval index within a currently preset period by putting an immediately previous index and the offset X'(i) into Equation 4.

For example, when a beam acquisition ID (BAD_ID) for the UE is 33, the number of the plurality of transmission intervals is 4 and a first repetitive transmission is performed (i=1), the UE may calculate a N(1) to be 8 by putting N(0), which corresponds to the beam acquisition ID (BA_ID), into Equation 1. Next, the UE may calculate X(1) to be 3 by putting the N(1) into Equation 2 and calculate X'(1) by using Equation 3. In this case, the UE may determine an offset to be 3 according to X'(1). Next, the UE may determine an interval index for transmitting a beam management signal in a current preset period to be 4 by putting the X'(1) and n(0) into Equation 4.

Alternatively, the UE may determine timing for transmitting a beam management signal within the determined transmission interval based on synchronization timing of a global navigation satellite system (GNSS). That is, the UE is an out-of-coverage state so that, even when no synchronization with a base station is performed, it may determine a transmission timing corresponding to each of the plurality of transmission intervals through synchronization based on the GNSS.

In addition, when transmitting a beam management signal in one preset period, a UE may transmit the beam management signal only in one transmission interval determined out of the plurality of transmission intervals and receive a beam management signal transmitted from other UEs in the remaining transmission intervals.

In addition, when a UE detects a beam management signal of another UE, the UE may check, through Equation 1 to Equation 4, whether or not the beam acquisition ID (BA_ID) is transmittable at a corresponding time. In other words, based on Equation 1 to Equation 4, the UE may additionally verify a beam management signal received from another UE.

Specifically, based on the received beam management signal of the another UE, the UE may acquire information (or i) on a predetermined period corresponding to the received beam management signal or a beam acquisition ID of another UE. The UE may estimate a transmission time (n (i)) of the beam management signal of the another UE by putting the acquired i and the beam acquisition ID of the another UE into Equation 1 to Equation 4. The UE may compare the estimated transmission time and an actual transmission time of the received beam management signal of the another UE. In this case, when the estimated transmission time and the actual transmission time are identical with each other, the UE may determine that a right beam management signal is received, and when the estimated transmission time and the actual transmission time are not identical with each other, the UE may determine that a wrong beam management signal is received. Thus, the UE may reduce false alarm by additionally verifying the received beam management signal of another UE based on Equation 1 to Equation 4.

Communication System Example to which the Present Invention is Applied

Although not limited thereto, various descriptions, functions, procedures, proposals, methods, and/or operational flow charts of the present invention disclosed in this document can be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 18:
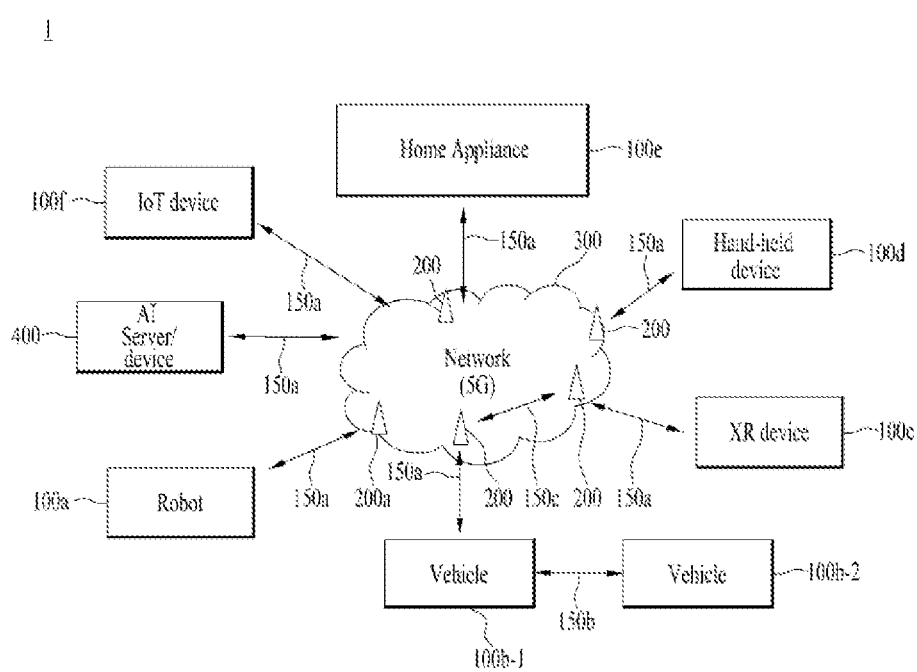
FIG. 18 illustrates a communication system which is applied to the present disclosure.

FIG. 18 illustrates a communication system applied to the present invention.

Referring to FIG. 18, a communication system 1 applied to the present invention includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present invention.

Examples of Wireless Devices to which the Present Invention is Applied

Figure 19:
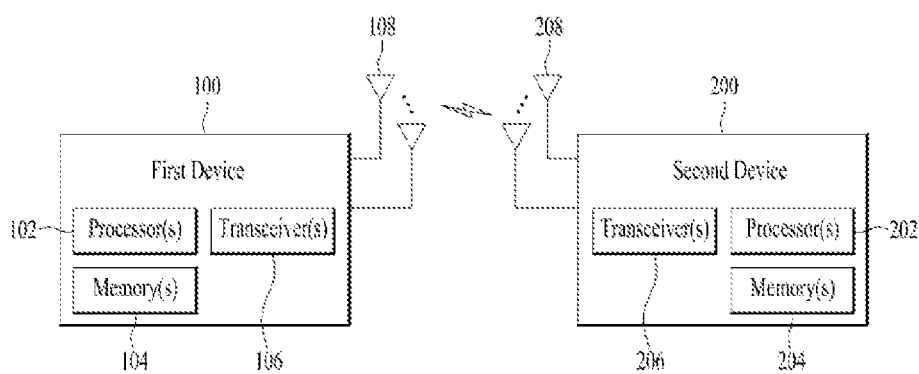
FIG. 19 illustrates a wireless device which is applicable to the present disclosure.

FIG. 19 illustrates a wireless device applicable to the present invention.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Invention is Applied

FIG. 20 illustrates another example of a wireless device applied to the present invention. The wireless device may be implemented in various forms according to a use-case/service (refer to FIG. 18)

Referring to FIG. 20, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Examples of Mobile Devices to which the Present Invention is Applied

Figure 21:
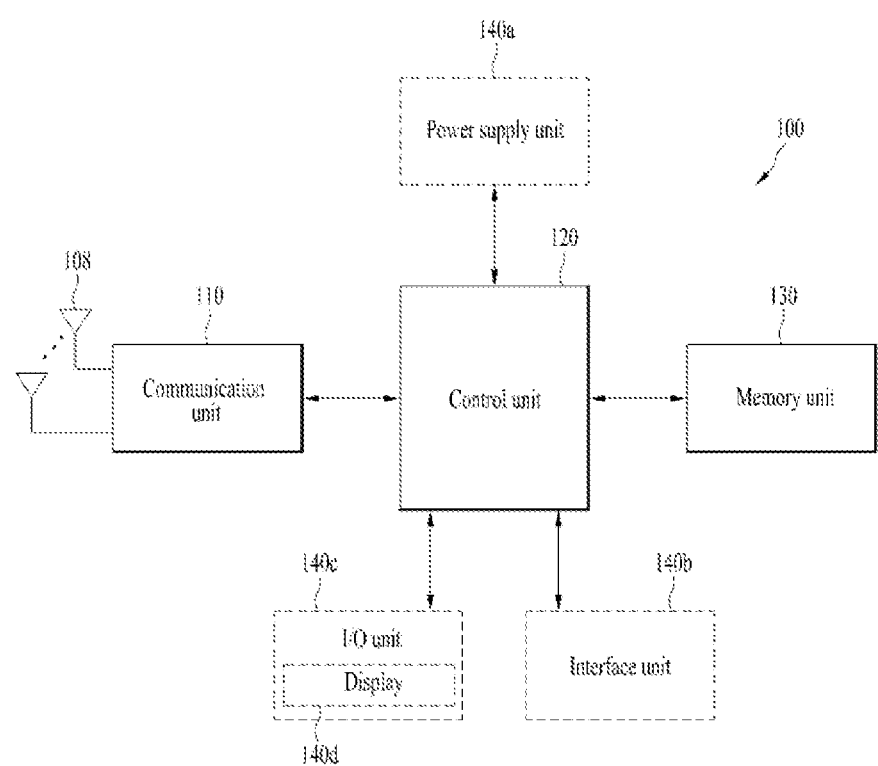
FIG. 21 illustrates a portable device which is applied to the present disclosure.

FIG. 21 illustrates a hand-held device applied to the present invention. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 22:
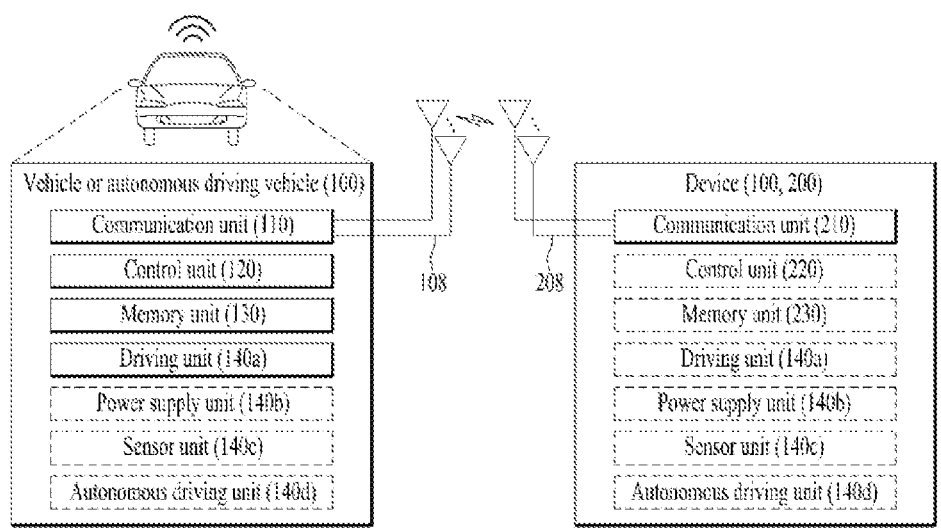
FIG. 22 illustrates a vehicle or autonomous vehicle which is applied to the present disclosure.

Examples of Vehicles or Autonomous Vehicles to which the Present Invention is Applied FIG. 22 illustrates a vehicle or an autonomous driving vehicle applied to the present invention. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present invention are combined in a predetermined form. Each component or feature should be considered optional unless explicitly stated otherwise. Each component or feature may be implemented in a form that is not combined with other components or features. In addition, it is also possible to constitute an embodiment of the present invention by combining some components and/or features. The order of operations described in the embodiments of the present invention may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present invention have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for transmitting by a user equipment (UE) a sidelink corresponding signal in a wireless communication system supporting sidelink, the method comprising:
receiving downlink control information (DCI) including information related to the sidelink;
performing synchronization based on sidelink synchronization signal (SLSS), wherein the SLSS includes primary sidelink synchronization signal (PSSS) and secondary sidelink synchronization signal (SSSS);
determining one or more resource pools, wherein the one or more resource pools are configured by a base station based on that sidelink resource allocation mode 1, and the one or more resource pools are determined by the UE based on that sidelink resource allocation mode 2, wherein a resource pool includes a plurality of contiguous frequency resources in a frequency domain, and a set of slots in a time domain;

obtaining setting information including information on an acquisition ID allocated to the UE;

determining a first transmission interval among a plurality of transmission intervals in which the sidelink corresponding signal is transmitted within a preset period; and transmitting the sidelink corresponding signal in the first transmission interval, wherein a consecutive interval index is allocated to each of the plurality of transmission intervals, and the first transmission interval is determined based on the acquisition ID.

2. The method of claim 1, wherein the sidelink corresponding signal is initially transmitted in a first transmission interval with an interval index that corresponds to a value calculated by modular arithmetic between the acquisition ID and a number of the plurality of transmission intervals.

3. The method of claim 1, wherein the sidelink corresponding signal is repeatedly transmitted in a first transmission interval with an interval index that is calculated by applying an offset to an interval index of a transmission interval in which the sidelink corresponding signal is transmitted immediately before the preset period, and wherein the offset is determined based on the acquisition ID.

4. The method of claim 3, wherein the offset is determined based on N(i) that is calculated by an equation below, $N(i)=\text{floor}(N(i-1)/C,1)$ and wherein i is a number of repeated transmissions of the sidelink corresponding signal, C is a number of the plurality of transmission intervals, and N(0) is a value corresponding to the acquisition ID.

5. The method of claim 4, wherein the offset is determined to be a value corresponding to $X_2(i)$ that is determined by an equation below, $X_2(i)=\text{mod}(\Sigma_1^i X1(i),C)$ $X_1(i)=\text{mod}(N(i),C)$ and wherein $X_1(0)$ is a value that is calculated by modular arithmetic between the acquisition ID and a number of the plurality of transmission intervals.

6. The method of claim 5, wherein the interval index of the first transmission interval is determined to be a value corresponding to n (i) that is calculated by an equation below, $n(i)=\text{mod}(n(i-1)+X_2(i),C)$, and wherein n(0) corresponds to $X_1(0)$.

7. The method of claim 1, wherein the acquisition ID is sequentially preallocated for UEs that belong to a preset geographic area.

8. The method of claim 7, wherein the preset geographic area is determined based on a zone ID corresponding to geographical information measured by the UE.

9. The method of claim 1, wherein the number of the plurality of transmission intervals is determined based on a time required for the UE to perform beam sweeping by using transmission beams.

10. The method of claim 1, wherein the sidelink corresponding signal is transmitted only in a first transmission interval that is one transmission interval of the plurality of transmission intervals.

11. The method of claim 1, wherein the UE performs a search for the sidelink corresponding signal transmitted by another UE in a remaining transmission interval excluding the first transmission interval among the plurality of transmission intervals.

12. The method of claim 1, wherein the UE determines transmission timing of the sidelink corresponding signal associated with the plurality of transmission intervals, based on synchronization timing of a global navigation satellite system (GNSS).

13. A user equipment (UE) transmitting a sidelink corresponding signal in a wireless communication system supporting sidelink, the UE comprising:

a radio frequency (RF) transceiver; and a processor coupled with the RF transceiver, wherein the processor is configured to:

receive downlink control information (DCI) including information related to the sidelink;

perform synchronization based on sidelink synchronization signal (SLSS), wherein the SLSS includes primary sidelink synchronization signal (PSSS) and secondary sidelink synchronization signal (SSSS), determine one or more resource pools, wherein the one or more resource pools are configured by a base station based on that sidelink resource allocation mode 1, and the one or more resource pools are determined by the UE based on that sidelink resource allocation mode 2, wherein a resource pool includes a plurality of contiguous frequency resources in a frequency domain, and a set of slots in a time domain, obtain setting information including information on an acquisition ID allocated to the UE, determine a first transmission interval among a plurality of transmission intervals in which the sidelink corresponding signal is transmitted within a preset period, and transmit the sidelink corresponding signal in the first transmission interval by controlling the RF transceiver, wherein the first transmission interval is determined based on the acquisition ID.

14. A chipset generating a sidelink corresponding signal in a wireless communication system supporting sidelink, the chipset comprising:

a memory configured to storing a program associated with generating the sidelink corresponding signal;

and a processor configured to generate the sidelink corresponding signal based on the program stored in the memory, wherein the processor is further configured to:

receive downlink control information (DCI) including information related to the sidelink, perform synchronization based on sidelink synchronization signal (SLSS), wherein the SLSS includes primary sidelink synchronization signal (PSSS) and secondary sidelink synchronization signal (SSSS), determine one or more resource pools, wherein the one or more resource pools are configured by a base station based on that sidelink resource allocation mode 1, and the one or more resource pools are determined by the UE based on that sidelink resource allocation mode 2, wherein a resource pool includes a plurality of contiguous frequency resources in a frequency domain, and a set of slots in a time domain, obtain setting information including information on an acquisition ID allocated from the memory to the UE, determine a first transmission interval among a plurality of transmission intervals in which the sidelink corresponding signal is transmitted within a preset period, and generate the sidelink corresponding signal that is to be transmitted in the first transmission interval, wherein the first transmission interval is determined based on the acquisition ID.

15. The UE of claim 13, wherein the processor is further configured to adjust a driving mode of a device connected to the UE based on the first transmission interval.

16. The method of claim 1, further comprising:
receiving a sidelink corresponding signal from another UE; and
verifying a sidelink corresponding signal for the another UE based on an acquisition ID included in the sidelink corresponding signal for the another UE.

* * * * *